United States Patent
Chernoguzov et al.

(10) Patent No.: US 6,700,483 B2
(45) Date of Patent: Mar. 2, 2004

(54) ALARM RECOVERY METHOD AND SYSTEM USING TWO NOTIFICATION MESSAGES

(75) Inventors: Alexander Chernoguzov, Warrington, PA (US); William R. Hodson, Telford, PA (US)

(73) Assignee: Honeywell International Inc., Morristown, NJ (US)

( * ) Notice: Subject to any disclaimer, the term of this patent is extended or adjusted under 35 U.S.C. 154(b) by 48 days.

(21) Appl. No.: 10/194,195

(22) Filed: Jul. 12, 2002

(65) Prior Publication Data

US 2004/0008111 A1 Jan. 15, 2004

(51) Int. Cl.[7] .............................................. G08B 29/00
(52) U.S. Cl. ........................ 340/506; 340/3.1; 340/3.2; 340/5.11; 700/12; 700/83
(58) Field of Search ............................. 340/691.1, 506, 340/454, 521, 3.1, 3.2, 5.11; 455/405; 709/224; 700/11, 12, 17, 83

(56) References Cited

U.S. PATENT DOCUMENTS

| | | | |
|---|---|---|---|
| 4,665,520 A | 5/1987 | Strom et al. ................... 371/7 |
| 4,816,208 A | 3/1989 | Woods et al. ............... 376/259 |
| 4,926,414 A | 5/1990 | Baratz et al. ................. 370/31 |
| 5,036,518 A | 7/1991 | Tseung ......................... 371/32 |
| 5,166,678 A | 11/1992 | Warrior ....................... 340/870 |
| 5,513,343 A | 4/1996 | Sakano et al. ......... 395/183.02 |
| 5,565,842 A | 10/1996 | Tamori ....................... 340/506 |
| 5,644,696 A | 7/1997 | Pearson et al. ........ 395/182.18 |
| 5,706,500 A | 1/1998 | Dzikewich et al. ......... 395/610 |
| 5,841,779 A | 11/1998 | Kainulainen ................ 370/514 |
| 5,852,650 A | * 12/1998 | Hyyrynen et al. ........ 379/29.01 |
| 5,920,258 A | 7/1999 | Kusyk et al. ................ 340/506 |
| 5,926,619 A | 7/1999 | Badovinatz et al. ... 395/182.02 |
| 5,982,293 A | 11/1999 | Everett et al. ......... 340/825.33 |
| 6,138,049 A | * 10/2000 | McLaughlin .................. 700/67 |
| 6,154,129 A | 11/2000 | Kajitani et al. ............. 340/506 |
| 6,161,198 A | 12/2000 | Hill et al. ...................... 714/15 |
| 6,237,034 B1 | 5/2001 | Fulford ........................ 709/224 |
| 6,243,830 B1 | 6/2001 | Nakatsugawa ............... 714/15 |
| 6,292,099 B1 | 9/2001 | Tse et al. .................... 340/506 |

\* cited by examiner

*Primary Examiner*—Jeffery Hofsass
*Assistant Examiner*—Eric Blount
(74) *Attorney, Agent, or Firm*—Anthony Miologos; Ohlandt, Greeley, Ruggiero & Perle, L.L.P.

(57) ABSTRACT

An alarm recovery method and device for regenerating a list of alarm state values of a device after loss of communication or other discontinuity in processing is disclosed. The method and device are implemented in a control system for the control of a process. In normal operation the device sends notification messages on a high priority basis to a computer to update the alarm state values of a list. When communication is lost and then resumed, or other discontinuity of processing occurs and is restored, the recovery procedure begins by notifying the notification manager of the start of the notification process, saving alarm condition disable states, disabling each enabled alarm condition, allowing the device to generate return-to-normal notifications, restoring the original alarm condition disable states, allowing the device to generate appropriate current active alarm notifications, and notifying the notification manager of the end of the notification process. The notification manager reliably re-synchronizes the alarm states since the re-generated alarms are communicated at the same priority as the new alarm state changes, preventing mis-matches possible with other alarm state-access methods.

14 Claims, 3 Drawing Sheets

| 1 BIT NO. | 2 ASSOCIATED ALARM CONDITION | 3 POSSIBLE ALARM STATES | 4 EXAMPLE ALARM STATE | 5 POSSIBLE DISABLE STATES | 6 EXAMPLE DISABLE STATE |
|---|---|---|---|---|---|
| 0 (LSB) | DISCRETE | ACTIVE OR INACTIVE | INACTIVE | DISABLE (T) OR ENABLE (F) | DISABLED (T) |
| 1 | HIGH-HIGH | ACTIVE OR INACTIVE | ACTIVE | DISABLE (T) OR ENABLE (F) | ENABLED (F) |
| 2 | HIGH | ACTIVE OR INACTIVE | ACTIVE | DISABLE (T) OR ENABLE (F) | ENABLED (F) |
| 3 | LOW-LOW | ACTIVE OR INACTIVE | INACTIVE | DISABLE (T) OR ENABLE (F) | ENABLED (F) |
| 4 | LOW | ACTIVE OR INACTIVE | INACTIVE | DISABLE (T) OR ENABLE (F) | ENABLED (F) |
| 5 | DEVIATION-HIGH | ACTIVE OR INACTIVE | ACTIVE | DISABLE (T) OR ENABLE (F) | ENABLED (F) |
| 6 | DEVIATION-LOW | ACTIVE OR INACTIVE | INACTIVE | DISABLE (T) OR ENABLE (F) | DISABLED (T) |
| 7 | BLOCK ALARM | ACTIVE OR INACTIVE | INACTIVE | DISABLE (T) OR ENABLE (F) | ENABLED (F) |
| 8-TO-15 | DEFINED BY BLOCK PROFILE BY FF | ACTIVE OR INACTIVE | - - - | DISABLE (T) OR ENABLE (F) | - - - |

FIG. 3

ALARM RECOVERY METHOD AND SYSTEM USING TWO NOTIFICATION MESSAGES

FIELD OF THE INVENTION

This invention relates to a method and system for resynchronizing a list of alarm states of a device that monitors or controls a process or a system, in whole or in part.

BACKGROUND OF THE INVENTION

An alarm state is a warning to a user of an event. Notifications are used to indicate and warn the user that an alarm state has changed, for example, from an inactive to an active state or from an active to an inactive state (the latter also called return-to-normal). A common type of alarm used, for example, by a process control system against an unwanted situation is based on testing of a process measurement, also known as a process variable. Analog process variables, such as temperatures, pressures, flows, levels, and the like, are often tested against high limits and low limits. When a process variable value becomes higher than a high limit, a high alarm becomes active and a notification is generated. Likewise, when a process variable value becomes lower than a low limit, a low alarm becomes active and similarly a notification is generated.

It is common to have two levels of alarm that behave similarly, using, for example, a high-high limit and a low-low limit. Another type of alarm is associated with a deviation from a current desired operating point, referred more commonly as a setpoint. When the process variable deviates from a setpoint more than the specified deviation-high-limit or deviation-low-limit, a deviation-high or deviation-low alarm becomes active, as appropriate.

For discrete process variables, such as a high-limit sensor or an over-temperature sensor, the apparatus itself indicates one of two-states such as "On" or "Off", "Yes" or "No", "Normal" or "Abnormal", "True" or "False", etc. The occurrence of an unwanted state can be used to set an associated alarm active. The limits that are used for testing of an unwanted state are alarm limits or alarm condition limits. Examples of alarm conditions are high, high-high, low, low-low, deviation-high, deviation-low, and discrete. Alarm condition states or alarm states are said to be either active or inactive.

Additionally, there are times when a process variable is expected to exceed an alarm limit, so an alarm condition state and alarm notification are not wanted. An example would be when equipment is desired to be shut down. An alarm condition disable state, or simply alarm disable state indicates that an alarm state should be disabled and rendered inactive for the associated alarm condition. Return-to-normal notifications are usually issued when an active alarm condition is rendered disabled.

U.S. Pat. No. 6,138,049 describes a notification system for handling the generation and distribution of notifications concerning the occurrence of events. According to the patent, a notification is an indication of some abnormal or exceptional situation relating to a controlled process, its measurement and control equipment. For example, notifications may comprise alarms, system events, operator messages, and the like. The notification system includes a supervisory controller and a plurality of process controllers. The supervisory controller is associated with each of the process controllers, directly or indirectly, to allow the exchange of information. The supervisory controller monitors characteristics (e.g., status, temperature, pressure, flow rate, current, voltage, power, utilization, efficiency, cost and other economic factors, etc.) of the process, either directly or indirectly through the process controllers. Depending upon the specific implementation, such monitoring may be of an individual process, a group of processes, or the whole facility.

The integrity of the data concerning the aforementioned process characteristics can be degraded by the occurrence of various operation events, such as supervisory controller startup, supervisory controller failover, process controller startup, process controller failover, control network communication failure and recovery and addition (via configuration) of a new process controller. A notification recovery system is provided to restore the integrity of the data after the system resumes normal operation.

The notification system includes a recovery procedure to restore the data integrity when normal operation resumes after the occurrence of any of the aforementioned events. The supervisory controller issues a recovery command to the process controller that is associated with the devices that provided the affected data. The process controller then executes a recovery program that provides the current values of the alarm states of its associated devices to the supervisory controller.

The notification system of the patent works very well when the devices and process controllers are compatible with one another, i.e., the devices and process controllers are native devices and native process controllers. However, the recovery procedure described in the patent does not address the situation of a control system that also has a non-native device, i.e., a device that is incompatible with the native devices and the native process controller.

There is a deficiency in some non-native devices, for example those devices that conform to the Foundation Fieldbus specifications ISA-S50.01-1992. The response to the reading of the current alarm condition states from any device is performed at a lower priority than the generation of notifications of on-going changes to those same alarm condition states (i.e., notification of a new active alarm condition or notification of a return-to-normal of a previously existing active alarm condition). Hence, the results of the reading of current alarm condition states can be incorrect due to the lack of guaranteed sequencing of the related communication messages.

Specifically, after requesting the reading of an inactive alarm condition state from a device in order to ascertain current alarm states, the response can be placed in a communications output buffer in the device. However, before it is communicated over the network, the alarm may become active (changing to the active state), causing an active alarm notification message to be placed in the same device's notification output buffer, which is separate from the read-response output buffer. Since notifications are specifically permitted access to the network at a higher priority than responses to reading the alarm condition states, the active alarm notification can be received by a notification manager first, even though placed in its output buffer later. Then the response to the reading of the alarm condition states may be received, indicating that the alarm condition is inactive. The notification manager can then falsely conclude that the alarm condition is inactive when, indeed, it has just become active.

Symmetrically, after requesting the reading of an active alarm condition state from a device in order to ascertain current alarm states, the response can be placed in a communications output buffer in the device. But before it is communicated over the network, the alarm may return to normal (changing to the inactive state), causing a return-to-normal notification message to be placed in the same device's notification output buffer, which is separate from the read-response output buffer. Since notifications are specifically permitted access to the network at a higher priority than responses to reading the alarm condition states, the return-to-normal notification can be received by a notification manager first even though placed in its output buffer later. Then the response to the reading of the alarm condition states may be received, indicating that the alarm condition is active. The notification manager can then falsely conclude that the alarm condition is active when, indeed, it has just become inactive.

What is needed is a mechanism to reliably ascertain the current alarm condition states from such non-native devices so that, for example, a notification manager can be guaranteed to be able to re-synchronize its alarm database with that of the devices after a communications loss and restoration or after recovery from some significant disturbance to the state of an involved computing element that may have resulted in a processing discontinuity such that a change in one or more alarm condition states may have been lost.

Thus, there is a need for a recovery procedure that can handle both native and non-native devices and controllers.

SUMMARY OF THE INVENTION

The method of the present invention synchronizes alarm condition states produced by a device that monitors and/or controls a process or a system. Particularly, the method synchronizes the notification messages after there has been a loss of communication with the device and after communication is restored with the device including, but not limited to, losses caused due to communications failures and processing discontinuities resulting from computing element failures, restarts, resets and so on.

When communication is restored, the method controls the device to regenerate current values of alarm states that it maintains. The method then provides first notification messages and second notification messages to a network. The first notification messages are for the current values of the alarm states. The second notification messages are for any changes in the alarm states that occur after the device regenerates the current values. The first notification messages and the second notification messages may be interspersed, but the sequential ordering for each alarm condition is assured to preserve correct alarm state interpretation.

The method controls the device by setting all of the alarm disable states to disabled and then restoring those alarm disable states that were previously enabled back to enabled. The first and second notification messages are provided after the previously enabled alarm disable states are restored to enabled. The method also reads and saves the alarm disable states prior to setting all of the alarm disable states to disabled for use during the restoration operation.

The device responds to the restoration operation to automatically generate a set of return-to-normal notifications, which, being irrelevant, are ignored or not provided to the network.

The system of the present invention includes means that perform the method of the invention.

BRIEF DESCRIPTION OF THE DRAWINGS

Other and further objects, advantages and features of the present invention will be understood by reference to the following specification in conjunction with the accompanying drawings, in which like reference characters denote like elements of structure and:

FIG. 3 is a table depicting exemplary alarm states of a non-native device.

DESCRIPTION OF THE PREFERRED EMBODIMENT

Figure 1:
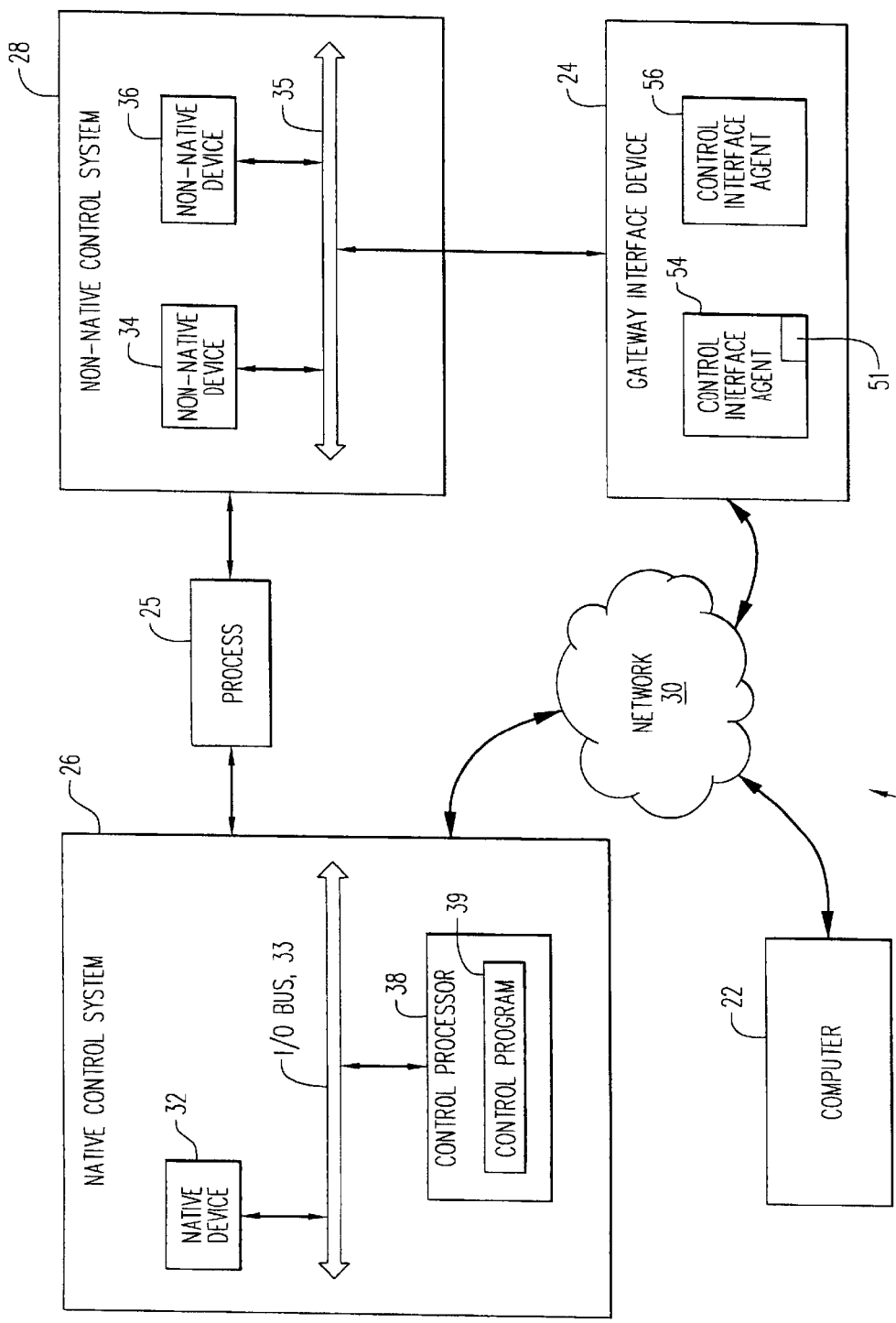
FIG. 1 is a block diagram of a control system in which the alarm recovery device and method of the present invention can be used.

Referring to FIG. 1, a control system 20 includes a computer 22, a gateway interface device 24, a native control system 26, a non-native control system 28 and a network 30. Computer 22 is interconnected with native control system 26 and gateway interface device 24 via network 30. Gateway interface device 24 is also directly interconnected with non-native control system 28. It should be apparent to those skilled in the art that gateway interface device 24 and non-native system 28 can alternatively be interconnected via network 30.

Native control system 26 includes one or more native devices 32 (shown as one, by way of example) that monitor and/or control a process 25. Native control system 26 also includes a control processor 38 that is interconnected with native device 32 via an input/output (I/O) BUS 33.

Control processor 38 is also interconnected with computer 22 and gateway interface device 24 via network 30. Control processor 38 includes a control program 39.

Non-native control system 28 includes one or more non-native devices 34 and 36 (shown as two, by way of example) that monitor and/or control the same process as monitored and controlled by native control system 26. Non-native devices 34 and 36 may include resident control software and are interconnected via a non-native BUS 35.

Computer 22 may be a single computer or a plurality of computers interconnected via network 30. Network 30 may be any suitable wired or wireless communication network and may include process control networks, factory automation networks, the Internet, an Intranet, the public telephone system and the like and combinations thereof.

Gateway interface device 24 may be any suitable interface device that includes a processor, a memory, an I/O unit for communication with non-native control system via non-native BUS 35 and a communication unit for communication with native control system 26 and computer 22 via network 30. Gateway interface device 24 includes one or more control interface agents 54 and 56 (two control interface agents are shown by way of example), Native devices 32 and non-native devices 34 and 36 may be any suitable devices that monitor or control process 25, such as sensors of temperature, pressure, flow, level, vibration, sound, current, voltage and the like, valves, pumps, electrical switches, and the like.

Control processor 38 may be any control processor that has a processor, a memory, an I/O unit for communications via I/O BUS with native devices 32 and a communications unit for communications via network 30. For example, if network 30 is the Internet, native device 32 has a browser capability for Internet communications. Similarly, computer 22 and gateway interface device 24 would be equipped with Internet capability to serve tiles and/or otherwise communicate via the Internet.

Figure 2:
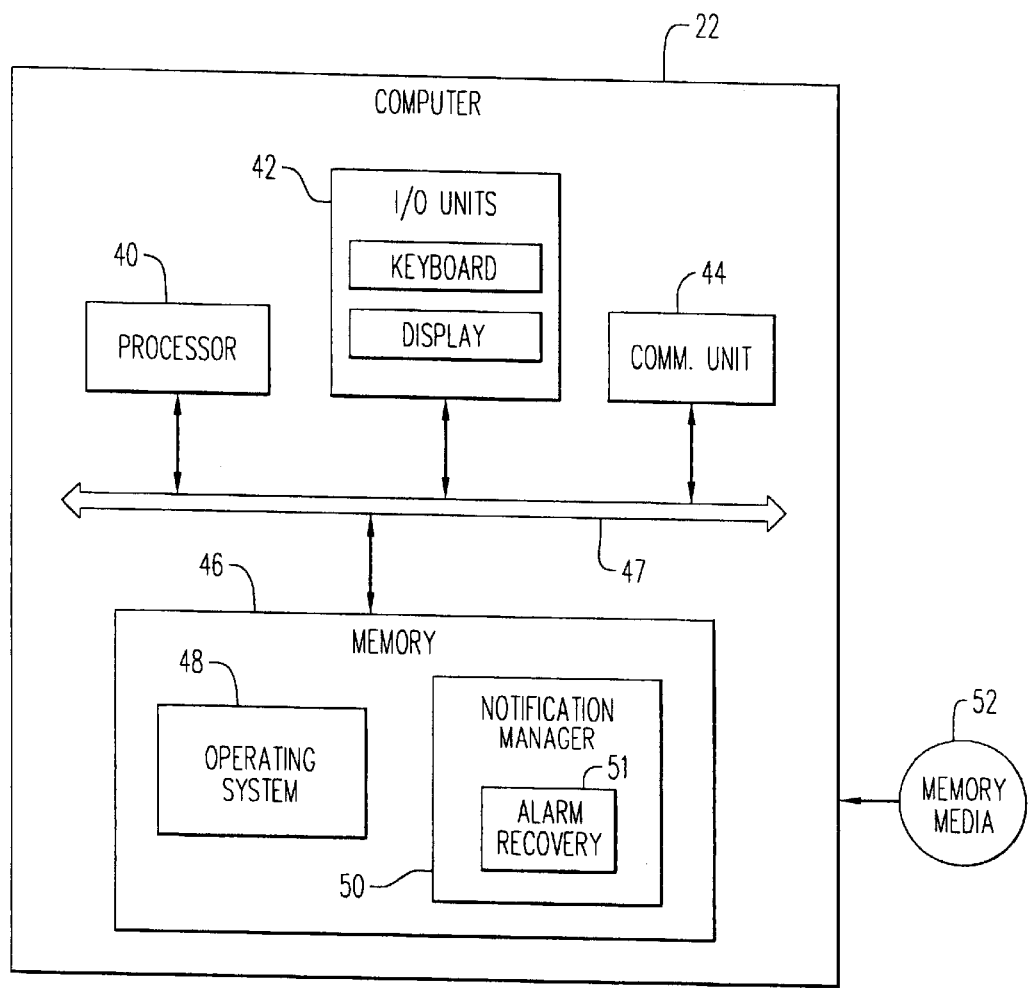
FIG. 2 is a block diagram of the computer of the FIG. 1 control system.

Referring to FIG. 2, computer 22 includes a processor 40, an input/output (I/O) unit 42, a communications unit 44, a memory 46 and a BUS 47. BUS 47 interconnects processor 40, I/O unit 42, communications unit 44 and memory 46. Memory 46 includes an operating system 48 and a notification manager program 50. Notification manager program 50 includes or controls an alarm recovery program 51. Operating system 48 controls processor 40 to execute notification manager program 50 and alarm recovery program 51 for recovering the current alarm states of non-native device 34 or 36 after an operational event or activity that affects the communication of alarm state data to computer 22. A memory media 52 (e.g., a disk) contains a copy of operating system 48, notification manager program 50, alarm recovery program 51 or other software, which can be loaded into memory 46. Communications unit 44 includes the capability to communicate via network 30.

Notification manager program 50 operates to recover alarm state data of native device 32 in a manner similar to that described in the forementioned U.S. Pat. No. 6,138,049. To recover alarm state data from non-native devices 34 or 36, alarm recovery program 51 is executed under the control of notification manager 50.

It will be apparent to those skilled in the art that alarm recovery program 51 can be executed solely by computer 22 or distributed for execution by and among computer 22, gateway interface device 24 and/or non-native devices 34 or 36. By way of example, a preferred embodiment in which alarm recovery program 51 is distributed among computer 22 and gateway interface device 24 will be described herein.

In particular, the parts of alarm recovery program 51 executed by gateway interface device 24 may be configured as control interface agent 54 by a configuration program (not shown) as taught in co-pending U.S. patent application, Ser. No. 10/194,380, filed on Jul. 12, 2002 and entitled Control Interface Agents By way of example, the alarm recovery device and method of the present invention will be described for the case where process 25 is for the control of a burner. For this example, non-native device 34 is assumed to be a temperature sensor that senses temperature of the combustion chamber of the burner, and non-native device 36 is assumed to be an adjustable valve that controls the flow rate of fuel to the burner. Also, it is assumed that nonnative device 34 is controlled by control interface agent 54 and that appropriate parts of recovery program 51 are configured in control interface agent 54 as depicted by reference numeral 51 in FIG. 1.

The non-native control devices 34 and 36 tend to have more intelligence than native control device 32. That is, non-native control devices 34 and 36 act as mini-controllers, in the sense that they are capable of running input and/or output operations or possibly control operations. For example, non-native devices 34 and 36 are capable of maintaining a status record of various alarm states.

Referring to FIG. 3, a table 60 depicts a status of eight different alarm conditions, each corresponding to a specific value of an alarm for non-native device 34. As process 25 runs, non-native device 34 monitors the temperature of the combustion chamber and records the alarm state values identified as enabled in table 60. When an alarm state value changes, a notification message is provided via gateway interface device 24 to computer 22. The notification message has a priority that is high relative to other messages of a supervisory nature. That is, the notification message is sent ahead of supervisory messages.

Notification manager program 50 in computer 22 maintains a list of only the active alarm state values of non-native device 34, which is updated according to the notification messages. That is, the notification manager program 50 maintains a list of only active alarm state values. A condition that goes inactive is deleted because, e.g., in a 30,000 point system, there might be 250,000 possible alarm conditions. Rarely will more than a few hundred alarm conditions be active simultaneously. Thus, finding an alarm that cleared (return-to-normal) is a challenge, as it no longer regenerates.

When there is a communication failure with non-native device 34, for example, no notification messages can be sent or received by computer 22. This affects the integrity of the alarm state value list maintained by notification manager program 50. The alarm recovery procedure of the present invention is initiated to restore the communication and to correct the alarm state value list in computer 22 to current alarm state values.

Notification manager 50 recognizes that communication has been restored to non-native device 34 either by software or manually. Upon this recognition, notification manager 50 takes a first step by requesting alarm recovery procedure 51 and control interface agent 54 to regenerate the alarm states of non-native device 34. In response, a second step is executed on control interface agent 54 to advise notification manager 50 that its current set of notifications from non-native device 34 are questionable.

In a third step, control interface agent 54 reads and saves current values of all alarm disable states of non-native device 34. During this time period, new alarm conditions may occur and result in notifications. Also, preexisting alarm conditions may return to normal and result in return-to-normal notifications. Control interface agent 54 forwards these notifications to notification manager 50.

In a fourth step, control interface agent 54 sets all alarm disable states of non-native device 34 that were enabled to a disable state. As a result, any existing alarm conditions in non-native device 34 will return to normal and are required to issue return-to-normal notifications.

In a fifth step, control interface agent 54 enters a wait mode so as to allow non-native device 34 to generate return-to-normal notifications. These are notifications that the alarms have been cleared (transitioned to the inactive state). Since these notifications are irrelevant, they are not forwarded to notification manager 50.

In a sixth step, control interface agent 54 resets the alarm disable states of non-native device 34 to the original values saved during the third step. Non-native device 34 responds to the sixth step to generate alarm notifications corresponding to conditions that currently exist and are enabled. It is to be noted that the currently active alarm states may have become active any time since the loss of communications until this point. Also, a new alarm condition may become active during this process. Symmetrically, the currently inactive alarm states may have become inactive any time since the loss of communication until this point. Also, a pre-existing alarm condition may become inactive (return-to-normal) during this process.

In a seventh step, control interface agent 54 waits for notifications to regenerate and forwards these notifications of regenerated or current alarm states to notification manager 50 in computer 22. Any alarm state changes that subsequently occur are sent as notification messages thereafter. This assures proper sequencing to avoid conflicts between regenerated current values and ongoing changes.

In an eighth step, control interface agent 54 notifies computer 22 that all regenerated notifications from non-native device 34 have been completed.

In a ninth step, notification manager 50 compares the regenerated alarm notifications with the pre-communication state list. If a regenerated alarm notification is in the pre-existing list, it is retained and its questionability is removed. If the regenerated alarm notification was not in the pre-existing list, it is added to the list, Upon notification of completion of the regeneration of notifications, any involved alarm notifications that retain a questionable indication are deleted, since the corresponding alarm conditions no longer exist in non-native device 34.

The present invention having been thus described with particular reference to the preferred forms thereof, it will be obvious that various changes and modifications may be made therein without departing from the spirit and scope of the present invention as defined in the appended claims.

What is claimed is:

1. A method for synchronizing alarm condition states produced by a device that monitors and/or controls a process or a system, said method comprising:

(a) controlling said device to regenerate current values of a plurality of alarm states; and (b) providing first notification messages and second notification messages to a network, wherein said first notification messages are for said current values of said alarm states, wherein said second notification messages are for any changes in said alarm states that occur as said device regenerates said current values, and wherein said first notification messages and said second notification messages are issued in a sequential order to assure that a final notification for each alarm condition indicates a correct alarm state value.

2. The method of claim 1, wherein step (a) is performed subsequent to a restoration of processing operations.

3. The method of claim 1, wherein step (a) is performed subsequent to a restoration of communication with said device after a loss of communication therewith.

4. The method of claim 1, wherein step (a) comprises setting all of said alarm disable states to disabled and then resetting those alarm disabled states that were previously enabled to enabled, and wherein step (b) provides said first and second notification messages after said resetting.

5. The method of claim 4, wherein step (a) further comprises reading and saving an enable/disable state associated with said alarm states prior to setting all of said alarm disable states to disabled.

6. The method of claim 4, wherein any return to normal notification messages generated in response to said step of setting are ignored.

7. The method of claim 6, wherein said return to normal notification messages are not provided to said network.

8. A system for synchronizing alarm condition states produced by a device that monitors and/or controls a process or a system, said system comprising:

means for controlling said device to regenerate current values of a plurality of alarm states; and means for providing first notification messages and second notification messages to a network, wherein said first notification messages are for said current values of said alarm states, wherein said second notification messages are for any changes in said alarm states that occur as said device regenerates said current values, and wherein said first notification messages and said second notification messages are issued in a sequential order to assure that a final notification for each alarm condition indicates a correct alarm state value.

9. The system of claim 8, wherein said device is controlled to regenerate said current values subsequent to a restoration of processing operations.

10. The system of claim 8, wherein said device is controlled to regenerate said current values subsequent to a restoration of communication with said device after a loss of communication therewith.

11. The system of claim 8, wherein said means for controlling comprises means for setting all of alarm disable states to disabled and then resetting those alarm disable states that were previously enabled to enabled, and wherein said means for providing provides said first and second notification messages after said resetting.

12. The system of claim 11, wherein said means for controlling further comprises means for reading and saving enable/disable states associated with said alarm states prior to setting all of said alarm disable states to disabled.

13. The system of claim 11, wherein any return-to-normal notification messages generated in response to said means for setting are ignored.

14. The system of claim 13, wherein said return-to-normal notification messages are not provided to said network.

* * * * *